United States Patent
Hehn et al.

(10) Patent No.: US 11,104,047 B2
(45) Date of Patent: Aug. 31, 2021

(54) TRANSFER FILM, METHOD FOR PRODUCING A TRANSFER FILM, USE OF A TRANSFER FILM, AND METHOD FOR COATING A COMPONENT

(71) Applicant: LEONHARD KURZ Stiftung & Co. KG, Furth (DE)

(72) Inventors: Roland Hehn, Herzogenaurach (DE); Steffen Falgner, Nuremberg (DE)

(73) Assignee: Leonhard Kurz Stiftung & Co. KG, Furth (DE)

( * ) Notice: Subject to any disclaimer, the term of this patent is extended or adjusted under 35 U.S.C. 154(b) by 137 days.

(21) Appl. No.: 16/310,986

(22) PCT Filed: Jun. 13, 2017

(86) PCT No.: PCT/EP2017/064338
§ 371 (c)(1),
(2) Date: Dec. 18, 2018

(87) PCT Pub. No.: WO2018/007107
PCT Pub. Date: Jan. 11, 2018

(65) Prior Publication Data
US 2019/0176378 A1   Jun. 13, 2019

(30) Foreign Application Priority Data
Jul. 7, 2016   (DE) .......................... 102016112505.9

(51) Int. Cl.
*B29C 45/14*   (2006.01)
*B32B 37/00*   (2006.01)
(Continued)

(52) U.S. Cl.
CPC .. *B29C 45/14827* (2013.01); *B29C 45/14811* (2013.01); *B32B 7/06* (2013.01);
(Continued)

(58) Field of Classification Search
CPC ......... B29C 45/14827; B29C 45/14811; B32B 37/025; B32B 27/08; B32B 27/40;
(Continued)

(56) References Cited

U.S. PATENT DOCUMENTS 7,906,054 B2   3/2011   Hirschfelder et al.
2007/0269671 A1 *  11/2007   Hirschfelder ....... B29C 45/1418
428/542.6
(Continued)

FOREIGN PATENT DOCUMENTS

CN   102795014 A   11/2012
EP   2845744 A2   3/2015
(Continued)

OTHER PUBLICATIONS

"Rubber, vulcanized or thermoplastic—Determination of tensile stress-strain properties," International Standard, ISO 37:2017(E), 36 pages.
(Continued)

*Primary Examiner* — Michael C Miggins
(74) *Attorney, Agent, or Firm* — Hoffmann & Baron, LLP (57) ABSTRACT

A transfer film includes a carrier film and a transfer ply, wherein the transfer film is provided for transferring the transfer ply to a component. A deep-drawing membrane is arranged between the carrier film and the transfer ply. A method for producing a transfer film as well as the use of a transfer film and a method for coating a component with a transfer film.

29 Claims, 3 Drawing Sheets

(51) Int. Cl.
*B32B 27/08* (2006.01)
*B32B 27/40* (2006.01)
*B32B 15/20* (2006.01)
*B32B 15/09* (2006.01)
*B32B 27/32* (2006.01)
*B32B 27/30* (2006.01)
*B32B 27/28* (2006.01)
*B32B 15/08* (2006.01)
*B32B 27/36* (2006.01)
*B32B 7/06* (2019.01)
*B32B 15/085* (2006.01)
*B32B 37/24* (2006.01)
*B32B 37/26* (2006.01)

(52) U.S. Cl.
CPC ............ *B32B 15/08* (2013.01); *B32B 15/085* (2013.01); *B32B 15/09* (2013.01); *B32B 15/20* (2013.01); *B32B 27/08* (2013.01); *B32B 27/283* (2013.01); *B32B 27/302* (2013.01); *B32B 27/304* (2013.01); *B32B 27/308* (2013.01); *B32B 27/32* (2013.01); *B32B 27/36* (2013.01); *B32B 27/40* (2013.01); *B32B 37/025* (2013.01); *B29K 2995/0089* (2013.01); *B32B 2037/243* (2013.01); *B32B 2037/268* (2013.01); *B32B 2255/24* (2013.01); *B32B 2255/26* (2013.01); *B32B 2255/28* (2013.01); *B32B 2307/402* (2013.01); *B32B 2307/406* (2013.01); *B32B 2307/4026* (2013.01); *B32B 2307/41* (2013.01); *B32B 2307/412* (2013.01); *B32B 2307/414* (2013.01); *B32B 2307/418* (2013.01); *B32B 2307/54* (2013.01); *B32B 2307/732* (2013.01); *B32B 2307/748* (2013.01); *B32B 2451/00* (2013.01)

(58) Field of Classification Search
CPC ......... B32B 15/20; B32B 15/09; B32B 27/32; B32B 27/304; B32B 27/283; B32B 27/302; B32B 15/08; B32B 27/36; B32B 7/06; B32B 27/308; B32B 15/085; B32B 2037/243; B32B 2037/268; B32B 2307/732; B32B 2255/26; B32B 2307/41; B32B 2255/24; B32B 2255/28; B32B 2307/748; B32B 2307/54; B32B 2307/406; B32B 2307/402; B32B 2307/412; B32B 2307/418; B32B 2307/4026; B32B 2307/414; B32B 2451/00; B29K 2995/0089

See application file for complete search history.

(56) References Cited

U.S. PATENT DOCUMENTS

| | | | |
|---|---|---|---|
| 2008/0032070 A1* | 2/2008 | Hirschfelder | ........... B29C 43/18 428/30 |
| 2010/0196651 A1 | 8/2010 | Liao et al. | |
| 2014/0120329 A1 | 5/2014 | Hu et al. | |

FOREIGN PATENT DOCUMENTS

| | | | | |
|---|---|---|---|---|
| JP | 06115295 A | | 4/1994 | |
| JP | 06183124 | * | 7/1994 | ............. B41M 3/12 |
| JP | 2011016353 A | | 1/2011 | |
| JP | 2013-126741 A | | 6/2013 | |
| WO | 2006/021199 A1 | | 3/2006 | |
| WO | 2016/106207 A1 | | 6/2016 | |

OTHER PUBLICATIONS

Wikipedia, "Polyethylene Terephthalate," https://en.wikipedia.org/wiki/Polyethylene_terephthalate, 24 pages.

* cited by examiner

TRANSFER FILM, METHOD FOR PRODUCING A TRANSFER FILM, USE OF A TRANSFER FILM, AND METHOD FOR COATING A COMPONENT

This application claims priority based on an International Application filed under the Patent Cooperation Treaty, PCT/EP2017/064338, filed Jun. 13, 2017, which claims priority to DE102016112505.9, filed Jul. 7, 2016.

BACKGROUND OF THE INVENTION

The invention relates to a transfer film, a method for producing a transfer film, as well as a use of a transfer film and a method for coating a component.

Decorative films for decoration are known from the state of the art, wherein different methods are used. The decorative films are formed as transfer films which comprise a carrier film and a transfer ply that can be detached from the carrier film.

In the case of the IMD method (IMD=in-mold decoration) a transfer film is placed in an injection mold and back-injection-molded. In particular the carrier film absorbs tensile forces which can occur during the deformation of the transfer film when it is applied to the contour of the mold surface, in particular at high speed, due to the high pressures and temperatures occurring during injection molding, and protects the transfer plies formed as varnish layers from cracks and other damage during the deformation. The surface finish of the transferred layers is also defined by this carrier film. The carrier film here thus acts as a deformation aid for the transfer plies. A disadvantage here is that the three-dimensionality of the deformation is defined by the comparatively low elasticity of the carrier film and is limited thereby.

In the case of insert molding a transfer film is applied to an in particular smooth, flat substrate. Then the carrier film is peeled off. During the subsequent deep-drawing of the substrate coated with the transfer plies between the two mold halves of a deep-drawing mold, the applied transfer plies have to absorb the tensile forces of the deformation. In particular in the field of protective layers, cracks etc. often occur in narrow radii.

In the case of the so-called 3DHS method a transfer film is placed on an already deformed part and hot-stamped. The transfer film is applied and adapted to the contour of the deformed part already before the hot-stamping, in particular with the aid of vacuum suction and pre-heating, and then hot-stamped with a correspondingly shaped and heated stamping die. As in the case of the IMD method, the carrier film absorbs tensile forces and is to protect the varnish layers to be transferred from cracks and other damage during the deformation.

In the case of the so-called TOM (three-dimensional overlay method) a transfer film is applied to an in particular smooth, flat substrate. Then the carrier film is peeled off. During the subsequent placing of the substrate coated with the transfer plies on an already deformed part and subsequent reshaping of the substrate corresponding to the shape of the part, the applied transfer plies have to absorb the tensile forces of the deformation. In particular in the field of protective layers, cracks etc. often occur in narrow radii.

SUMMARY OF THE INVENTION

The object of the present invention is therefore to specify in particular a transfer film that is improved with respect to deformability.

A transfer film, comprising a carrier film and a transfer ply that can be detached from the carrier ply, is specified, wherein the transfer film is provided for transferring the transfer ply to components, in particular to three-dimensional components, and wherein it is proposed that a deep-drawing membrane is arranged between the carrier film and the transfer ply.

Furthermore, a use of a transfer film according to the invention in an IMD method, or in an insert molding method, or in a TOM, is specified.

Moreover, a method for producing a transfer film, in particular a transfer film according to the invention, is specified, having a carrier film, a transfer ply that can be detached from the carrier film and a deep-drawing membrane arranged between the carrier film and the transfer ply, wherein the deep-drawing membrane is produced or applied by means of casting methods or by means of screen printing, gravure printing, flexographic printing or inkjet printing.

In addition, a method for coating a component by means of a transfer film according to the invention is specified.

The deep-drawing membrane has the advantage that it is capable of absorbing tensile forces and can thereby act as a deformation aid for the transfer ply. It further protects the transfer ply from cracks and other damage during the deformation. By a three-dimensional component is meant here in particular a component which is deformed in three dimensions, thus in a length, width and height extension, for example a housing for a device.

It can be provided that the deep-drawing membrane is formed as a varnish layer with a layer thickness in the range of from 10 µm to 200 µm, preferably in the range of from 20 µm to 100 µm, further preferably in the range of from 25 µm to 75 µm.

In an advantageous design, it can be provided that the deep-drawing membrane is formed of polyurethane. The polyurethane can be solvent-based or an aqueous dispersion. The polyurethane must be sufficiently deformable and can be composed of various polymers. These include polyurethanes made of e.g. polyester polyols, polyether polyols, polycarbonate polyols, polyacrylate polyols and combinations of these polymers. Polyurethane made of polyester polyols can preferably be used. These polymers form the basis for varnish formulations from which the deep-drawing membrane is produced.

In order to achieve a sufficient layer thickness, these layers can preferably be produced in the casting method, for example by means of application with a slit die, or also by means of screen printing, gravure printing, flexographic printing or inkjet printing. The named production methods can be applied in one pass or in several successive passes. Furthermore, a combination of the individual methods is also possible in principle.

The first-applied layer, in particular varnish layer, is preferably at least partially dried between the successive passes, with the result that the layer is at least surface-dry. However, the layer can in particular also be dried through. After this drying, a following layer is deposited, wherein the following layer etches the previously deposited layer preferably at least on the surface such that both layers together form a homogeneous total layer. In the case of more than two successive layers, in particular varnish layers, the procedure is preferably performed a corresponding number of times in order that all successive layers together form a homogeneous total layer.

In a preferred embodiment a layer is applied in one pass, in particular a varnish layer with a layer thickness in the range of from approximately 0.1 µm to 50 µm, preferably in the range of from 0.1 µm to 35 µm, further preferably in the range of from 1 µm to 25 µm. By means of such comparatively thin partial layers, as described above, total layers with greater layer thicknesses can then be built up.

The deep-drawing membrane can be formed transparent, translucent or opaque and at the same time can be colorless or colored. An at least partial opacity and/or chromaticity makes it easier to recognize the presence of the deep-drawing membrane on the decorated substrate or component. In particular when the deep-drawing membrane remains on the substrate or component as an additional protective layer for an even longer time, such a visual recognizability can be helpful. This protective layer can, for example, remain on the substrate or component until it is finally used and/or has been transported to a destination and has fulfilled the function as a protective layer against damage.

It is advantageous if the deep-drawing membrane has a decoration, e.g. a pattern or a motif, for example a logo or writing. The writing can contain, for example, manufacturer information or also instructions for use for the deep-drawing membrane and/or for the substrate or component.

The decoration or motif can in particular be imprinted on the deep-drawing membrane. For example it is possible to cast the deep-drawing membrane in a first casting process, thereafter to print the decoration or motif and then to embed the decoration or motif in the deep-drawing membrane in a second casting process. The decoration or motif can consist of the same material as the deep-drawing membrane or also of different materials, for example of PVC or another polyurethane, from the deep-drawing membrane.

The deep-drawing membrane can be provided over the whole surface, thus on the entire surface of the transfer film, or alternatively can be provided only in areas. It is possible for example to provide the deep-drawing membrane only in the areas of surface in which particularly strong deformations occur during the processing of the transfer film and for example not to provide it in areas of surface in which only small deformations or none at all occur during the processing of the transfer film. It is also possible for example not to provide the deep-drawing membrane only in an in particular narrow edge area of the transfer film, in order to be able to peel off the deep-drawing membrane more easily at this now visually recognizable and tactilely accessible edge. For this, at its edge the deep-drawing membrane can also have a handling aid for easier peeling-off, for example at least one tab or the like.

It can be provided that the deep-drawing membrane is formed stretchable by 200%, preferably by 500% to over 1500% at a deep-drawing temperature in the range of from 130° C. to 160° C. The values were determined in standardized tensile tests (DIN 53504, ISO 37) using the Zwick Z005 testing device from Zwick GmbH & Co. KG, Ulm.

It can be provided that a first detachment layer is arranged between the carrier film and the deep-drawing membrane and that a second detachment layer is arranged between the deep-drawing membrane and the transfer ply.

It can further be provided that the first and/or the second detachment layer consist/consists of a wax. This can be e.g. a carnauba wax, montanic acid ester, polyethylene wax, polyimide wax or a PTFE wax (PTFE=polytetrafluoroethylene). Moreover, surface-active substances such as silicones are suitable as the detachment layer. Thin layers of varnishes crosslinked with melamine formaldehyde resin can also act as the detachment layer.

In an advantageous design it can be provided that the first and/or the second detachment layer have/has a layer thickness smaller than 1 µm, in particular smaller than 0.1 µm.

It can advantageously be provided that the force for detaching the carrier film from the deep-drawing membrane, because of the first detachment layer arranged between carrier film and deep-drawing membrane, is 5 to 10 times smaller than the force for detaching the deep-drawing membrane from the transfer ply, because of the second detachment layer arranged between deep-drawing membrane and transfer ply. The detachment values were determined with the aid of a tensile testing machine (Zwick 2005 from Zwick GmbH & Co. KG, Ulm). For this, the transfer film was glued flat to the lower holder. The layer to be detached was then detached at a right angle by the tensile test. The detachment forces were determined via the load cell.

The transfer ply can be formed as a multilayer body formed of several transfer layers.

It can be provided that the force for detaching the deep-drawing membrane from the transfer ply, because of the second detachment layer arranged between deep-drawing membrane and transfer ply, is 30% to 70% smaller than the adhesive force between the neighboring transfer layers.

The transfer ply can comprise a first transfer layer facing the deep-drawing membrane, a second transfer layer and a third transfer layer. The first and/or third transfer layer can also be dispensed with.

The first transfer layer can be formed as a protective layer.

The protective layer can be formed as a protective varnish made of a PMMA-based varnish with preferably a layer thickness in the range of from 2 µm to 5 µm. The protective varnish can also consist of a radiation-curing dual-cure varnish. This dual-cure varnish can be thermally pre-crosslinked in a first step during and/or after application in liquid form and can be radically post-crosslinked in a second step after the processing of the transfer film, in particular via high-energy radiation, preferably UV radiation. Dual-cure varnishes of this type can consist of various polymers or oligomers, which have unsaturated acrylate or methacrylate groups. These functional groups can be radically crosslinked with each other in the above-named second step. For the thermal pre-crosslinking in the first step, at least two or more alcohol groups must also be present in the case of these polymers or oligomers. These alcohol groups can be crosslinked with multifunctional isocyanates or melamine formaldehyde resins. Various UV raw materials such as epoxy acrylates, polyether acrylates, polyester acrylates and in particular acrylate acrylates come into consideration as unsaturated oligomers or polymers. Both blocked and unblocked representatives based on TDI (TDI=toluene-2,4-diisocyanate), HDI (HDI=hexamethylene diisocyanate) or IPM (IPDI=isophorone diisocyanate) come into consideration as isocyanate. The melamine crosslinkers can be fully etherified versions, can be imino types or can represent benzoguanamine representatives. Many of these protective varnishes would be insufficiently deformable and thus insufficiently capable of deep-drawing without the deep-drawing membrane.

It can also be provided that the protective layer is formed as a protective varnish made of a varnish based on PMMA (PMMA=polymethyl methacrylate) or a varnish based on a mixture of PVDF (PVDF=polyvinylidene fluoride) and PMMA, with preferably a layer thickness in the range of from 2 µm to 50 µm, preferably in the range of from 5 µm to 30 µm. These varnishes bring the mechanical brittleness needed for a transfer film and for being able to sufficiently precisely and cleanly stamp it out or separate it at the desired outer boundaries of the transferred areas of surface of the transfer plies.

The second transfer layer can be formed as a single- or multi-layered decorative layer. This decorative layer preferably comprises one or more layers. The decorative layer can preferably have one or more color layers, in particular colored varnish layers. These color layers can be dyed differently, can be formed transparent and/or opaque and can also be separated by one or more further layers, in particular transparent layers. The color layers here can consist of a binder and colorant and/or pigments, in particular also optically variable pigments and/or metallic pigments. Further, the decorative layer can also comprise one or more reflective layers, which are preferably formed opaque, translucent and/or partially. In particular, the reflective layers can consist of metals and/or HRI layers (HRI=High Refractive Index), thus layers with a high refractive index, in particular higher than 1.5. For example aluminum, chromium or copper or alloys thereof come into consideration as metals. For example ZnS or $SiO_2$ come into consideration as HRI layers. Further, the decorative layer can also have one or more optically active relief structures, in particular diffractive structures and/or holograms and/or refractive structures and/or matte structures. At least one reflective layer is arranged directly on the relief structure at least in areas.

The second transfer layer is preferably formed as a color layer.

It can be provided that the color layer is formed of a varnish based on PMMA with preferably a layer thickness in the range of from 1 µm to 10 µm.

The third transfer layer can be formed as a base coat. The base coat is an adhesive layer and/or adhesion-promoter layer.

It can be provided that the base coat is formed with a layer thickness in the range of from 1 µm to 5 µm. Raw materials coming into consideration for the base coat are PMMA, PVC, polyester, polyurethanes, chlorinated polyolefins, polypropylene, epoxy resins or polyurethane polyols in combination with deactivated isocyanates. The base coats can moreover contain inorganic fillers. The base coat is preferably made of PVC for the use of the transfer film in insert molding and preferably made of polyurethane polyols in combination with deactivated isocyanates for the use of the transfer film in a TOM.

The production of the transfer film can in particular be effected in that the deep-drawing membrane is produced in several successive passes or from several layers. In particular, a sufficient layer thickness can be achieved hereby. The individual layers of the deep-drawing membrane can preferably be produced in the casting method, for example by means of application with a slit die, or also by means of screen printing, gravure printing, flexographic printing or inkjet printing.

It is preferred if the first-applied layer for producing the deep-drawing membrane, in particular varnish layer, is at least partially dried between the successive passes. In particular, the layer is dried in such a way that the layer is at least surface-dry. However, the layer can also be dried through. After the drying, a following layer is then preferably deposited. The following layer is preferably applied such that it etches the previously deposited layer preferably at least on the surface. It is advantageous if the two layers together form a homogeneous total layer due to the etching.

In the case of more than two successive layers for producing the deep-drawing membrane, the procedure is performed a corresponding number of times in order that all successive layers together form a homogeneous total layer.

In a preferred embodiment a layer, in particular a varnish layer, is applied in one pass with a layer thickness in the range of from approximately 0.1 µm to 50 µm, preferably in the range of from 0.1 µm to 35 µm, further preferably in the range of from 1 µm to 25 µm. By means of such comparatively thin partial layers, as described above, total layers with greater layer thicknesses can then be built up.

In the following, methods for coating a component by means of the previously described transfer film, in particular with the transfer ply of the previously described transfer film, are described.

It can be provided that the method is formed as an IMD method, wherein the transfer film is inserted into an injection mold and the transfer film is back-injection-molded with a plastic.

After the back-injection molding, the carrier film is preferably peeled off the transfer film. The deep-drawing membrane can also be peeled off together with the transfer film. However, it is advantageous if the deep-drawing membrane remains on the transfer ply at least at first. The deep-drawing membrane thus acts in particular as a protective layer for the transfer ply. Here, in particular, a protective layer of its own for the transfer ply can be dispensed with. It is also conceivable that the deep-drawing membrane is peeled off shortly before the use of the coated component or not until the component is used. Among other things, the component is hereby prevented from experiencing any damage prematurely, still before being used. It is advantageous here if the transfer ply has a protective layer of its own, which protects the transfer ply from external influences when the component is used.

It can be provided that the method is formed as an insert molding method, which comprises laminating a substrate, deep-drawing the laminated substrate and back-injection molding the deep-drawn substrate with a thermoplastic, wherein the carrier film of the transfer film is peeled off the substrate after the lamination of the substrate, and wherein the deep-drawing membrane is peeled off the back-injection-molded substrate after the back-injection molding.

In the following, examples with and without deep-drawing membrane are described, which illustrate the advantage of the deep-drawing membrane.

If a previously known transfer film, which is actually provided for processing in the IMD method, is processed in a deep-drawing process, usually optical defects result. This is accounted for by the fact that an IMD film is provided for high stabilities and comparatively small deformations. Because of the comparatively small deformations, in particular, the protective layer of an IMD film can be particularly hard, which reduces its deformability. These high stabilities are, nevertheless, also desired for components which are processed in a deep-drawing process, which is then attended by greater deformations of the transfer film, however.

Such a known transfer film can be built up as follows:

A detachment layer, which can consist for example of a polyethylene wax, is applied to a carrier film, preferably made of PET, with a layer thickness of 36 µm to 100 µm. A protective layer with a layer thickness of 3 µm to 5 µm is deposited on this detachment layer. This protective layer is a PMMA-based varnish. Moreover, colored varnishes, which are likewise PMMA-based and are applied in varying layer thicknesses between 2 µm and 15 µm, are deposited on the protective layer. The colored varnishes can contain different pigments and can be printed over the whole surface or in the decoration. As the latter, this transfer film contains a suitable base coat, which generates sufficient adhesion for the respectively provided substrate. In the present case this base coat can consist of a PVC-vinyl acetate copolymer, with a layer thickness of 1 µm. This film is laminated onto a substrate for processing as an insert. The substrate can consist of an acrylonitrile-butadiene-styrene copolymer, the thickness of which lies between 200 µm and 750 µm. The laminating conditions are 120° C. to 300° C., preferably 180° C. to 220° C., with a linear load of 0.1 kN/cm to 1.0 kN/cm, preferably 0.3 kN/cm to 0.4 kN/cm. In this laminating process, the carrier film is detached, with the result that the uppermost layer remaining is now formed by the protective layer. This laminated substrate can subsequently be processed in a vacuum deep drawing process. The laminated product is heated to approx. 140° C. to 160° C. and drawn over a mold geometry with the aid of negative pressure/vacuum.

If the deep-drawn film is a transfer film (actually) designed for the IMD method (as described above), the following damage patterns result: the film can tear in stronger strain areas, with the result that a gap passes through all or also only a part of the varnish package of the transfer ply. This is predominantly due to the fact that the IMD protective varnishes cannot absorb tensile forces sufficiently and thus split open when stretched. Moreover, the surface smoothness (gloss) of the protective varnish layer will decrease and the points with a high level of strain (in particular where the protective varnish is greatly thinned) become cloudy, or milky, in particular due to a plurality of microcracks, with the result that black decorations lying underneath e.g. appear gray. This is due, above all, to the fact that the surface finish of the protective varnish is no longer predefined by the carrier film, as the latter has already been removed after the laminating process. A PET carrier film would be too rigid for a strain typical for an insert.

The present invention solves this problem using the deep-drawing membrane according to the invention. Given, as mentioned above, a carrier film made of PET, which preferably has a layer thickness of approximately 36 µm to 100 µm, and a first detachment layer made of a polyethylene wax, then the deep-drawing membrane, which consists e.g. of a polyurethane, can be applied to this first detachment layer. This deep-drawing membrane preferably has a layer thickness of 10 µm to 200 µm. Underneath the deep-drawing membrane, a second detachment layer, in particular made of montanic acid ester, with a thickness preferably smaller than 1 µm can be arranged, the detachment force of which differs from that of the first detachment layer, in particular its detachment force is approx. 5 to 10 times higher than the detachment force of the first detachment layer. The rest of the structure of the transfer film preferably consists, as mentioned above, of a PMMA based protective varnish, the layer thickness of which preferably lies in the range of from 2 µm to 5 µm. The following chromophoric decorative layers are in particular likewise PMMA-based and are preferably in the range of from 2 µm to 15 µm. In this modified structure, in particular, the same PVC-vinyl acetate base coat is used as in the preceding example.

If this extended film structure is laminated onto an ABS substrate (thickness 200 µm to 750 µm), the carrier film can be removed afterwards. The varnished deep-drawing membrane now forms the uppermost layer of the substrate (insert material). If the laminated product is now deep-drawn at 140° C. to 188° C., this uppermost deep-drawing membrane absorbs the tensile forces of the strains and at the same time defines the surface quality of the protective layer lying underneath it.

After the vacuum forming the deep-drawing membrane can now be peeled off the protective layer. There is thus no possibility of the molded component tearing and the surface of the protective varnish remains glossy and thus transparent. Although all varnishes which were applied to the component are identical in the two examples, an optically flawless component was generated only in the method according to the invention.

It can also be provided that the method is formed as a TOM, which comprises laminating a substrate, coating the back of the substrate with a TOM base coat and applying the laminated and base-coated substrate to a three-dimensional component, wherein the carrier film of the transfer film is peeled off before or after the coating of the substrate, and wherein the deep-drawing membrane is peeled off the transfer ply after the application of the laminated and base-coated substrate to the component.

The aim was to produce a transfer film for the TOM. Such a transfer film was previously unknown, above all because sufficiently thermoformable carrier films which at the same time withstand the conditions of the production of a transfer film have not been available to date. PET, which has been coated as first detachment layer in particular with a polyethylene wax with a layer thickness preferably smaller than 1 µm, was chosen as carrier film material. In particular a polyurethane-polyester polyol layer with a thickness of 30 µm was applied to this as deep-drawing membrane. A montanic acid ester layer with a thickness in particular smaller than 1 µm was applied to this as second detachment layer. The detachment force of the second detachment layer differs from that of the first detachment layer, in particular its detachment force is approx. 5 to 10 times higher than the detachment force of the first detachment layer. A decorative layer consisting of a mixture of PMMA/PVDF with a layer thickness of 30 µm was applied to this second detachment layer as first layer of the transfer ply. The colored varnish package based on PMMA varnishes with a total thickness of 8 µm was applied to this as second layer of the transfer ply. The base coat consisting of a layer 8 µm thick based on a combination of polyurethane polyols with a deactivated isocyanate was applied to this. The carrier film was peeled off before the processing in the TOM on a machine from Navitas, Japan. The processing at 130° C. provided a good initial adhesion to the substrate, which was a three-dimensionally shaped ABS/PC injection-molded part. After storage of the injection-molded parts over several days, the deep-drawing membrane was peeled off, wherein the transfer ply broke loose with sharp edges.

It can further be provided that the method is formed as a TOM, which comprises applying the transfer film to a three-dimensional component, wherein the carrier film is peeled off the deep-drawing membrane before the application of the transfer film to the component, and wherein the deep-drawing membrane is peeled off the transfer ply after the application of the transfer film to the component. After the carrier film has been peeled off, the transfer film is still self-supporting and easy to handle because of the deep-drawing membrane. The deep-drawing membrane thus takes on the function of the carrier film, but is much more deformable than known carrier films. The application of the transfer film with deep-drawing membrane to the component is effected for example at 100° C. to 180° C. and with an air overpressure of 0.1 bar to 2 bar.

BRIEF DESCRIPTION OF THE DRAWINGS

The invention is now explained in more detail with reference to embodiment examples. There are shown in.

DETAILED DESCRIPTION OF THE PREFERRED EMBODIMENTS

Figure 1:
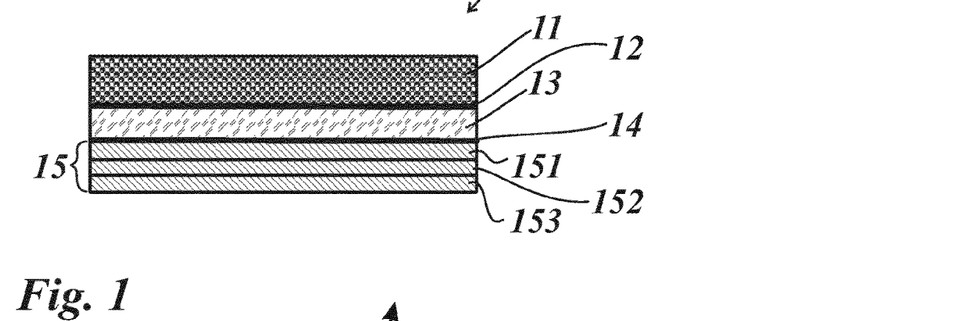
FIG. 1 a first embodiment example of the transfer film according to the invention in a schematic sectional representation.

FIG. 1 shows a transfer film 1, which comprises a carrier film 11, a first detachment layer 12, a deep-drawing membrane 13, a second detachment layer 14 and a transfer ply 15 with several transfer layers 151, 152, 153.

The further details describe the embodiment example represented in FIG. 1.

The carrier film 11 is formed as a PET film with a layer thickness in the range of from 12 to 100 µm.

The deep-drawing membrane 13 is formed as a varnish layer made of polyurethane with a layer thickness in the range of from 10 µm to 200 µm, preferably in the range of from 20 µm to 100 µm, further preferably of from 25 µm to 75 µm. The polyurethane can be solvent-based or an aqueous dispersion. The polyurethane must be sufficiently deformable and can be composed of different polymers. These include polyurethanes made of e.g. polyester polyols, polyether polyols, polycarbonate polyols, polyacrylate polyols and combinations of these polymers. Polyurethane made of polyester polyols can preferably be used. These polymers form the basis for varnish formulations from which the deep-drawing membrane 13 is produced.

In order to achieve a sufficient layer thickness, these layers can preferably be produced in the casting method, for example by means of application with a slit die, or also by means of screen printing, gravure printing, flexographic printing or inkjet printing. The named production methods can be applied in one pass or in several successive passes.

The first-applied varnish layer is preferably at least partially dried between the successive passes, with the result that the varnish layer is at least surface-dry. However, the varnish layer can in particular also be dried through. After this drying the following varnish layer is deposited, wherein the following varnish layer etches the previously deposited varnish layer in particular at least on the surface such that both varnish layers together form a homogeneous total varnish layer. In the case of more than two successive varnish layers, the procedure is performed a corresponding number of times in order that all successive varnish layers together form a homogeneous total varnish layer.

In a preferred embodiment a varnish layer is applied in one pass with a layer thickness in the range of from 0.1 µm to 50 µm, preferably in the range of from 0.1 µm to 35 µm, further preferably in the range of from 1 µm to 25 µm. By means of such comparatively thin partial varnish layers, as described above, total varnish layers with greater layer thicknesses can then be built up.

The deep-drawing membrane 13 is formed stretchable by 200%, preferably by 500% to over 1500% at a deep-drawing temperature in the range of from 130° C. to 160° C.

The first detachment layer 12 is arranged between the carrier film 11 and the deep-drawing membrane 13, is formed of a wax, which can be e.g. carnauba wax, montanic acid ester, polyethylene wax, polyamide wax or PTFE wax, and has a layer thickness in the range of less than 0.1 µm. Moreover, surface-active substances such as silicones are suitable as first detachment layer. Thin layers of varnishes crosslinked with melamine formaldehyde resin can also act as first detachment layer.

A second detachment layer 14 is arranged between the deep-drawing membrane 13 and the transfer ply 15. The second detachment layer 14, like the first detachment layer 12, is formed of a wax, which can be e.g. carnauba wax, montanic acid ester, polyethylene wax, polyamide wax or PTFE wax, and has a layer thickness in the range of less than 0.1 µm. Moreover, surface-active substances such as silicones are suitable as second detachment layer 14. Thin layers of varnishes crosslinked with melamine formaldehyde resin can also act as second detachment layer 14.

The force for detaching the carrier film 11 from the deep-drawing membrane 13, because of the first detachment layer 12 arranged between carrier film 11 and deep-drawing membrane 13, is 5 to 10 times smaller than the force for detaching the deep-drawing membrane 13 from the transfer ply 15, because of the second detachment layer 14 arranged between deep drawing membrane 13 and transfer ply 15. For this, the first detachment layer 12 can, for example, be made of polyethylene wax and the second detachment layer 14 can, for example, be made of montanic acid ester.

The transfer ply 15 is formed as a multilayer body which has three transfer layers 151 to 153.

The first transfer layer 151 faces the second detachment layer and is formed as a protective layer. The first transfer layer can be formed, for example, as a protective varnish made of acrylate with a layer thickness of 4 µm to 8 µm or of polyurethane with a layer thickness of 15 µm to 30 µm.

The second transfer layer 152 is formed as a color layer made of acrylate with a layer thickness of 4 µm to 20 µm.

The third transfer layer 153 is formed as a base coat with a layer thickness of 1 µm to 5 µm. Raw materials coming into consideration for the base coat are PMMA, PVC, polyester, polyurethanes, chlorinated polyolefins, polypropylene or epoxy resins or polyurethane polyols in combination with deactivated isocyanates. The base coats can moreover contain inorganic fillers.

The force for detaching the deep-drawing membrane 13 from the transfer ply 15, because of the second detachment layer 14 arranged between deep-drawing membrane 13 and transfer ply 15, is approximately 30% to 70% smaller than the adhesive force of the neighboring transfer layers 151 to 153 with respect to each other.

Figure 2:
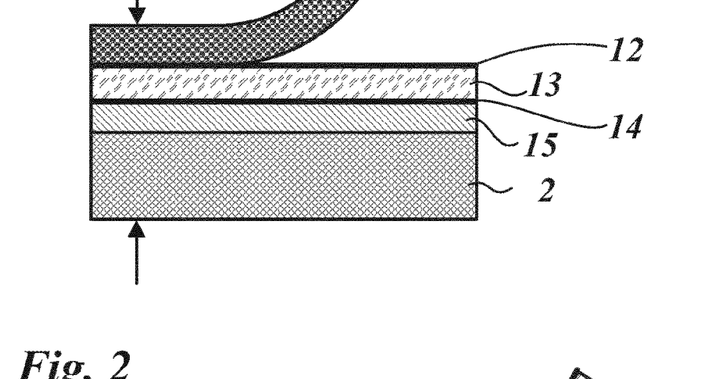
FIG. 2 a first method step for producing an insert using the transfer film in FIG. 1 in a schematic sectional representation.
Figure 3:
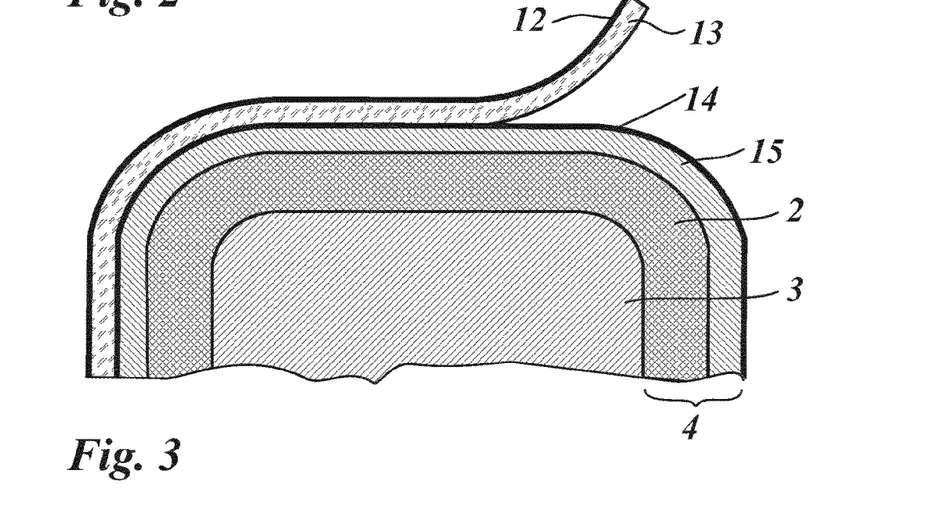
FIG. 3 a second method step for producing an insert using the transfer film in FIG. 1 in a schematic sectional representation.

FIGS. 2 and 3 show method steps for producing an insert using the transfer film 1 described in FIG. 1.

FIG. 2 shows the application of the transfer film 1 under the action of temperature and pressure (indicated by directional arrows in FIG. 2) to a substrate 2 as well as the detachment of the carrier film 11 after the lamination of the substrate 2.

The substrate 2 can be formed, for example, as a film made of ABS (acrylonitrile-butadiene-styrene copolymer) with a layer thickness in the range of from 100 μm to 1000 μm.

It has proved to be worthwhile to apply a linear load in the range of from 0.1 kN/cm to 1.0 kN/cm, preferably in the range of from 0.3 kN/cm to 0.4 kN/cm, at a temperature in the range of from 120° C. to 300° C., preferably in the range of from 180° C. to 220° C., in order to join the transfer film 1 to the substrate.

FIG. 3 shows a further method step, in which the substrate 2 laminated with the transfer film 1 is vacuum-formed using a mold 3 at a temperature in the range of from 130° C. to 160° C., wherein the deep-drawing membrane 13 is then removed from the transfer ply 15. During the deep-drawing, the deep-drawing membrane 13 absorbs the tensile forces of the strains occurring and at the same time defines the surface quality of the protective layer of the transfer ply 15 lying underneath it. There is thus a finished decorated insert 4, which is trimmed by die cutting in the following steps and back-injection-molded with a thermoplastic.

Figure 4:
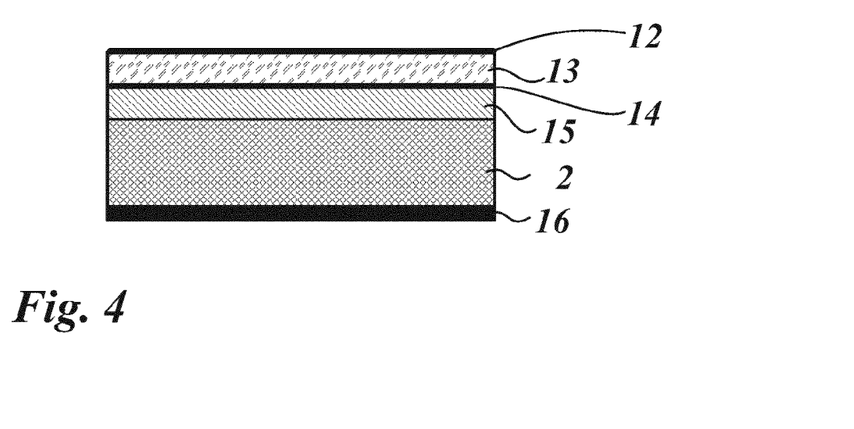
FIG. 4 a method step for forming a TOM laminating film using the transfer film in FIG. 1 in a schematic sectional representation.
Figure 5:
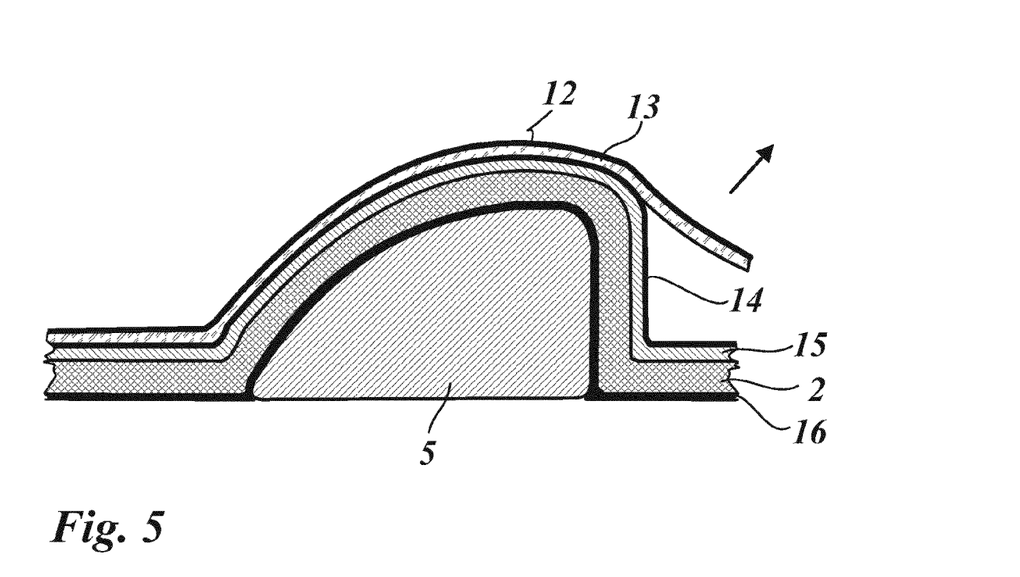
FIG. 5 the coating of a component with the TOM laminating film in FIG. 4 in a schematic sectional representation.

FIGS. 4 and 5 show method steps for coating a component 5 with a TOM laminating film.

In a first method step the transfer film 1 is laminated onto a smooth, flat substrate 2 and after the lamination the carrier film 11 is removed, as described further above in FIG. 2.

Thereafter, to form a TOM laminating film on the back of the substrate 2, a TOM base coat with layer thicknesses of 5 μm to 20 μm is applied, as represented in FIG. 4. Such base coats for the TOM usually consist of polypropylene, of a combination of polyurethane polyols with deactivated isocyanates, polyurethanes or epoxy resins. If epoxy resins are used it is advantageous to apply a suitable spray base coat to the component in addition to the base coat. These spray base coats typically contain various raw materials containing amino groups. The other types are heat-activated.

A further method step is represented in FIG. 5, in which in the TOM a three-dimensional component 5 is coated with the TOM laminating film described in FIG. 4 and then the deep-drawing membrane 13 is removed.

In a further method step the coating of the component 5 is trimmed by die cutting, milling or laser trimming.

Figure 6:
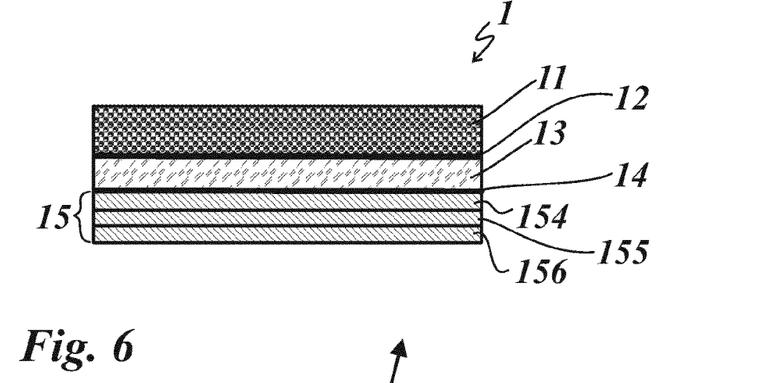
FIG. 6 a second embodiment example of the transfer film according to the invention in a schematic sectional representation.

FIG. 6 shows a second embodiment example of the transfer film. A transfer film 1 is formed like the transfer film described in FIG. 1, with the difference that the third transfer layer 153 is formed as a TOM base coat. The TOM base coat has a comparatively large layer thickness and is preferably formed as a combination of polyurethane polyols with deactivated isocyanates. The TOM base coat is already activatable at the low process temperatures of approximately 100° C. to 180° C. and the low process pressures of 0.1 bar to 2 bar and, because of the crosslinking reaction effected by the activation, can have a higher temperature resistance on the finished component. The transfer film 1 is used in the TOM. In the case of the transfer film, the trimming by die cutting, milling or laser trimming is dispensed with.

Figure 7:
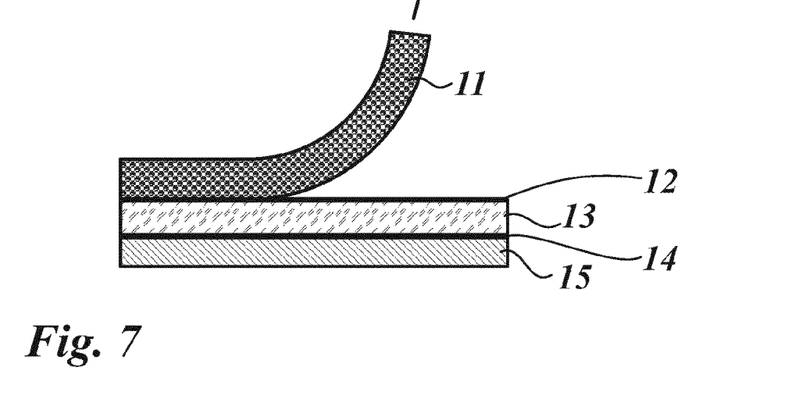
FIG. 7 a first method step of a TOM for coating a component with the transfer film in FIG. 1 in a schematic sectional representation.

FIG. 7 shows a first method step, in which the carrier layer 11 is peeled off the transfer film 1.

Figure 8:
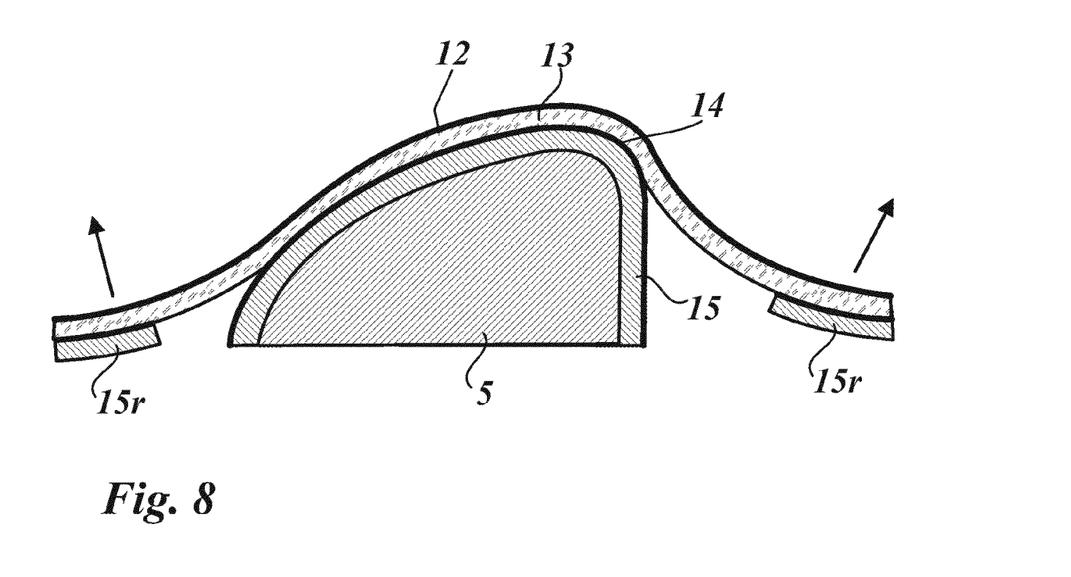
FIG. 8 a second method step of a TOM for coating a component with the transfer film in FIG. 1 in a schematic sectional representation.

FIG. 8 shows a second method step, in which in the TOM a component 5 is coated with the layer composite described in FIG. 7.

The deep-drawing membrane 13 is peeled off after the coating of the component 6, wherein residues 15*r* of the transfer ply 15 remaining on the deep-drawing membrane 13 are also removed. The transfer ply 15 here has the necessary mechanical brittleness in order that a clean separation of the transfer ply 15 between the parts thereof applied to the component 5 and the residues 15*r* can be effected at the edge of the component 5. The transfer ply 15 is finally trimmed with edges flush with the component 5.

LIST OF REFERENCE NUMBERS

1 transfer film
2 substrate
3 mold
4 insert
5 component
11 carrier film
12 first detachment layer
13 deep-drawing membrane
14 second detachment layer
15 transfer ply
15*r* residual portion of the transfer ply
16 TOM base coat
151 first transfer layer
152 second transfer layer
153 third transfer layer

The invention claimed is:

1. A transfer film comprising a carrier film and a transfer ply that can be detached from the carrier film, wherein the transfer film is provided for transferring the transfer ply to a three-dimensional component, and wherein a deep-drawing membrane is arranged between the carrier film and the transfer ply, and
wherein a first detachment layer is arranged between the carrier film and the deep-drawing membrane, and wherein a second detachment layer is arranged between the deep-drawing membrane and the transfer ply.

2. The transfer film according to claim 1, wherein the deep-drawing membrane is formed as a varnish layer with a layer thickness in the range of from 10 μm to 200 μm.

3. The transfer film according to claim 1, wherein the deep-drawing membrane is formed of polyurethane.

4. The transfer film according to claim 1, wherein the deep-drawing membrane is formed transparent, translucent or opaque.

5. The transfer film according to claim 1, wherein the deep-drawing membrane has a decoration or a motif.

6. The transfer film according to claim 1, wherein, in its edge area, the deep-drawing membrane has a handling aid for peeling off the deep-drawing membrane.

7. The transfer film according to claim 1, wherein the deep-drawing membrane is formed stretchable by 200%.

8. The transfer film according to claim 1, wherein the deep-drawing membrane is formed as a printed layer.

9. The transfer film according to claim 1, wherein the deep-drawing membrane is formed of several layers.

10. The transfer film according to claim 1, wherein the deep-drawing membrane is formed as a homogeneous total layer.

11. The transfer film according to claim 1, wherein the transfer ply is formed as a multilayer body formed of transfer layers.

12. The transfer film according to claim 1, wherein the first detachment layer and/or the second detachment layer comprises a wax.

13. The transfer film according to claim 1, wherein the first detachment layer and/or the second detachment layer are/is formed of montanic acid ester or polyethylene.

14. The transfer film according to claim 1, wherein the first detachment layer and/or the second detachment layer have/has a layer thickness smaller than 0.1 μm.

15. The transfer film according to claim 1, wherein the detachment force of the deep-drawing membrane, because of the second detachment layer arranged between deep-drawing membrane and transfer ply, is 30 to 70% smaller than the adhesive force between two neighboring transfer layers.

16. The transfer film according to claim 1, wherein the deep-drawing membrane is not formed over the whole surface.

17. The transfer film according to claim 16, wherein the deep-drawing membrane is not formed in an edge area of the transfer film.

18. The transfer film according to claim 1, wherein the transfer ply comprises a first transfer layer facing the deep-drawing membrane, a second transfer layer and a third transfer layer.

19. The transfer film according to claim 18, wherein the first transfer layer is formed as a protective layer.

20. The transfer film according to claim 19, wherein the protective layer is formed as a protective varnish made of a PMMA-based varnish with a layer thickness in the range of from 2 μm to 50 μm.

21. The transfer film according to claim 19, wherein the protective layer is formed as a protective varnish made of a varnish based on PMMA (PMMA=polymethyl methacrylate) or a varnish based on a mixture of PVDF (PVDF=polyvinylidene fluoride) and PMMA, with a layer thickness in the range of from 2 μm to 50 μm.

22. The transfer film according to claim 18, wherein the second transfer layer is formed as a single- or multi-layered decorative layer.

23. The transfer film according to claim 22, wherein the second transfer layer is formed as a color layer.

24. The transfer film according to claim 18, wherein the third transfer layer is formed as a base coat.

25. The transfer film according to claim 24, wherein the base coat is formed with a layer thickness in the range of from 1 to 5 μm.

26. The transfer film according to claim 1, wherein the force for detaching the carrier film from the deep-drawing membrane, because of the first detachment layer arranged between carrier film and deep-drawing membrane, is 5 to 10 times smaller than the force for detaching the deep-drawing membrane from the transfer ply, because of the second detachment layer arranged between deep-drawing membrane and transfer ply.

27. The transfer film according to claim 26, wherein the first detachment layer is formed of polyethylene wax and the second detachment layer is formed of montanic acid ester.

28. A transfer film comprising a carrier film and a transfer ply that can be detached from the carrier film, wherein the transfer film is provided for transferring the transfer ply to a three-dimensional component, and wherein a deep-drawing membrane is arranged between the carrier film and the transfer ply, and
wherein the transfer ply comprises a first transfer layer facing the deep-drawing membrane, a second transfer layer and a third transfer layer, and
wherein the second transfer layer is formed as a single- or multi-layered decorative layer, and
wherein the second transfer layer is formed as a color layer, and
wherein the color layer is formed of a varnish based on PMMA with a layer thickness in the range of from 1 μm to 10 μm.

29. The transfer film according to claim 28, wherein a first detachment layer is arranged between the carrier film and the deep-drawing membrane and wherein a second detachment layer is arranged between the deep-drawing membrane and the transfer ply.

* * * * *